US008301646B2

(12) United States Patent
Byrne et al.

(10) Patent No.: US 8,301,646 B2
(45) Date of Patent: Oct. 30, 2012

(54) RESEARCH COLLECTION AND RETENTION SYSTEM

(75) Inventors: David M. Byrne, Shawnee, KS (US); John L. Parnell, Lee's Summit, MO (US); Robert E. Barnes, Lawrence, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 499 days.

(21) Appl. No.: 12/195,489

(22) Filed: Aug. 21, 2008

(65) Prior Publication Data

US 2010/0049690 A1 Feb. 25, 2010

(51) Int. Cl.
*G06F 7/14* (2006.01)
*G06F 17/30* (2006.01)

(52) U.S. Cl. ......... 707/756; 707/705; 707/941; 707/942

(58) Field of Classification Search .................. 707/101, 707/705, 736, 756, 102, 104.1, 999.101, 707/999.102, 999.107, 941, 942, 999.1, 999.104, 707/608; 705/7, 10; 715/236, 239, 249, 715/234, 243
See application file for complete search history.

(56) References Cited

U.S. PATENT DOCUMENTS

| | | | | |
|---|---|---|---|---|
| 5,864,871 | A * | 1/1999 | Kitain et al. ........................ | 1/1 |
| 6,691,116 | B1 * | 2/2004 | Bart ..................................... | 1/1 |
| 2002/0016800 | A1 * | 2/2002 | Spivak et al. .................. | 707/523 |
| 2004/0083217 | A1 * | 4/2004 | Brackett et al. ............... | 707/100 |
| 2005/0033726 | A1 * | 2/2005 | Wu et al. ........................... | 707/1 |
| 2005/0149566 | A1 * | 7/2005 | Baek et al. .................. | 707/104.1 |
| 2007/0185751 | A1 * | 8/2007 | Dempers .......................... | 705/7 |
| 2009/0070295 | A1 * | 3/2009 | Otomori et al. ................... | 707/3 |
| 2010/0169378 | A1 * | 7/2010 | Tinberg et al. ................ | 707/781 |

OTHER PUBLICATIONS

Web page from http://www.techterms.com shoiwng a definition for the term "format," dated Jun. 26, 2008, retrieved via http://www.archive.org on May 11, 2011.*

* cited by examiner

*Primary Examiner* — Bruce Moser
(74) *Attorney, Agent, or Firm* — Swanson & Bratschun, L.L.C.

(57) ABSTRACT

A system and method for managing research produced by outside research vendors includes a storage unit, data repository stored on the storage unit, and a processing unit in communication with the storage unit and data repository. The processing unit may be configured to collect first research reports from first and second research vendors, where the first and second research reports have first and second formats, respectively. The processing unit may further be configured to reformat the first research reports from the first format into a third format, reformat the second research reports from the second format into the third format, store the reformatted first and second research reports in the data repository, and provide access to the first and second research reports in the third format to members of the organization.

19 Claims, 7 Drawing Sheets

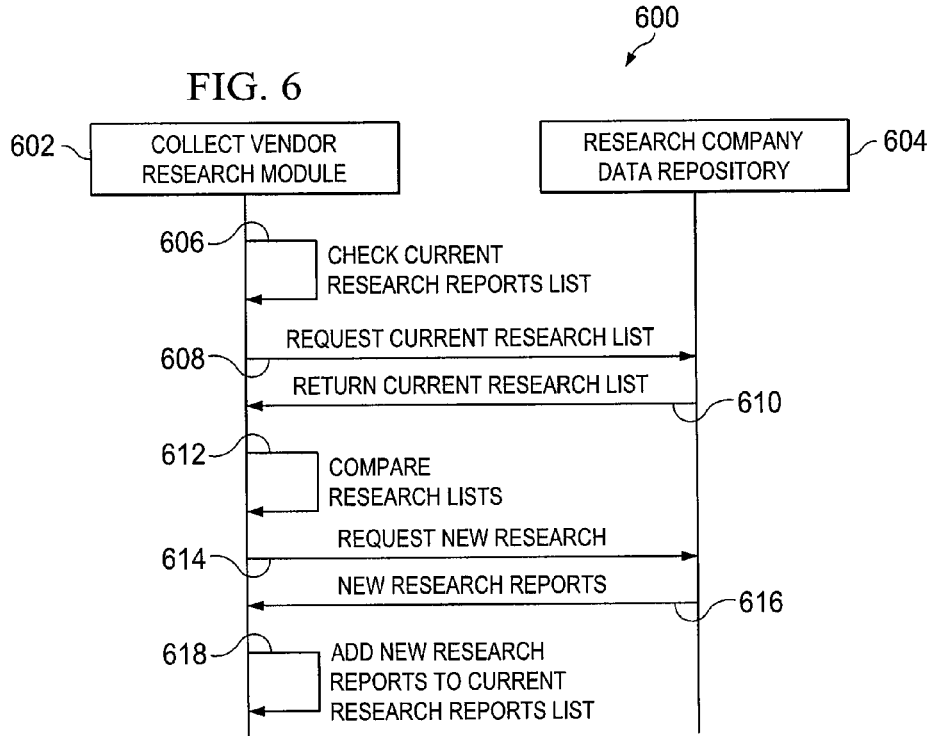
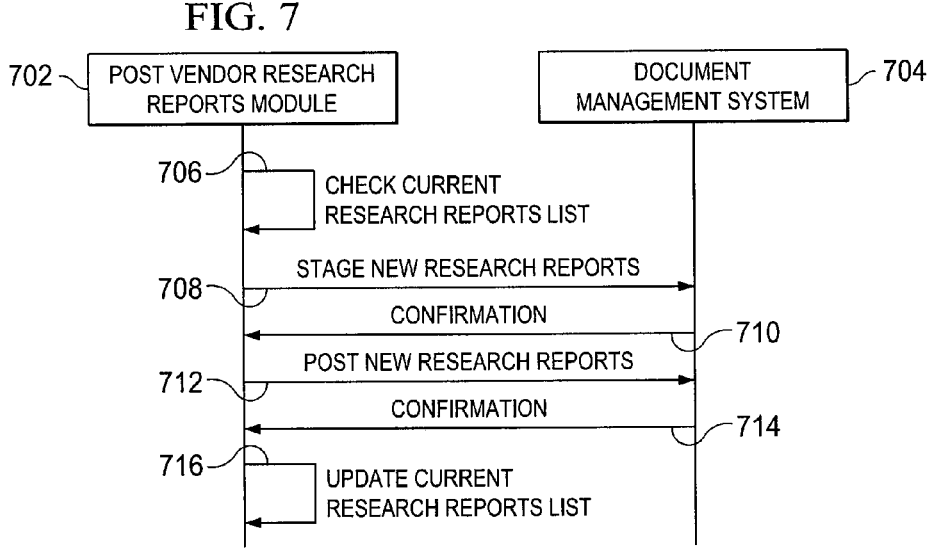

RESEARCH COLLECTION AND RETENTION SYSTEM

BACKGROUND OF THE INVENTION

Organizations pay a lot of money for external researchers to perform various types of research every year. Research may range from economic research, scientific research, engineering research, competitor research, and so forth. For example, an engineer may order an engineering research project from an outside engineering consultant firm, while a marketing manager may order an industry survey from a marketing research firm. Research reports ate generally sent to a member of an organization who ordered the research. The members typically use the research reports for their specific purposes and store the research on their computers or files. For large companies with thousands of employees, a lot of research can be performed by many different research firms and the resulting research, while potentially helpful to many employees or members, is typically only made available to a few.

Employees who work with outside research companies typically have to learn how to use a user interface of each outside research company's user interface. Often, the user interfaces are very different from each other. Furthermore, each research company produces research reports using different formats.

In addition, to work with each outside research company, each authorized employee is generally required to maintain a customer number of the company or employee and password. Maintaining such information can become cumbersome, especially if three or more research is companies are used.

Another problem that exists with the use of outside research companies is termination of a relationship with a research company. Once the relationship has been terminated, any research performed by the research company generally becomes inaccessible to members of the organization. Thereafter, member of the organization must maintain the research reports. Given that employees switch companies so often these days, much research becomes lost by the relationship becoming terminated with an outside research company, an employee leaving, or misplacement of the research reports.

SUMMARY

To overcome the problems that exist when using external research companies, the principles of the present invention provide for a centralized research collection and retention system ("research system"). The research system is configured to collect research information from outside research companies, format the collected research information to have a common format, and retain the research reports so that the research information can be accessed by any member or employee authorized to access the research information. The research system may eliminate each member having to maintain separate user names and passwords for each external research company as the research system may be configured to collect research reports from multiple outside research companies.

One embodiment of a process for managing research produced by outside research vendors includes establishing a relationship between an organization and a first research vendor to perform research and produce first research reports. A first data repository operated by the first research vendor may be accessed, where the first data repository stores the first research reports. A relationship may be established between the organization and a second research vendor to perform research and produce second research reports. A second data repository operated by the second research vendor may be accessed, where the second data repository stores the second research reports. The first and second research reports may be collected from the first and second repositories of the first and second research vendors, where the first and second research reports have first and second formats, respectively. The first research reports may be reformatted from the first format into a third format. The second research reports may be reformatted from the second format into the third format. The reformatted first and second research reports may be stored in a central data repository. Access may be provided to the first and second research reports in the third format to members of the organization.

One embodiment of a system for managing research produced by outside research vendors includes a storage unit, data repository stored on the storage unit, and a processing unit in communication with the storage unit and data repository. The processing unit may be configured to collect first research reports from first and second research vendors, where the first and second research reports have first and second formats, respectively. The processing unit may further be configured to reformat the first research reports from the first format into a third format, reformat the second research reports from the second format into the third format, store the reformatted first and second research reports in the data repository, and provide access to the first and second research reports in the third format to members of the organization.

BRIEF DESCRIPTION OF THE DRAWINGS

Illustrative embodiments of the present invention are described in detail below with reference to the attached drawing figures, which are incorporated by reference herein and wherein:

FIG. 6 is a timing diagram of an illustrative process for software collecting and storing research reports from a research company or vendor;

FIG. 7 is a timing diagram of an illustrative process for storing and managing research reports;

DETAILED DESCRIPTION OF THE DRAWINGS

Figure 1:
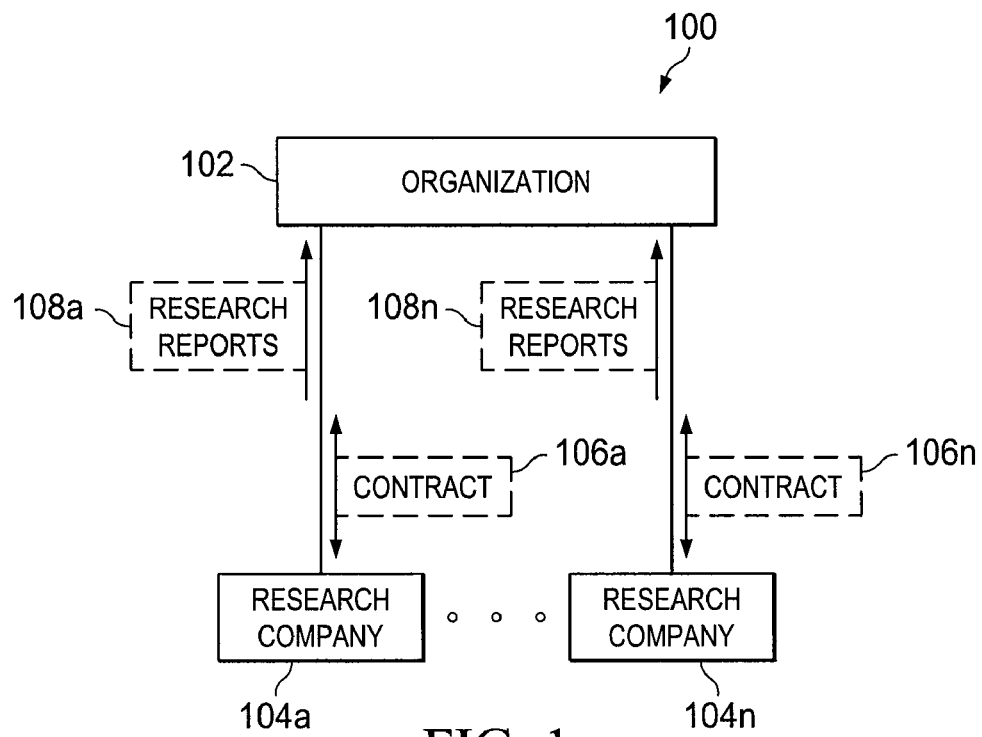
FIG. 1 is a block diagram of an illustrative business relationship established between an organization and research companies hired to perform research on one or more areas of interest for members of the organization.

With regard to FIG. 1, an organization 102, which may be a company, governmental agency, or any other organization, may establish relationships with external research companies 104a-104n (collectively 104) to perform research. The research companies may be considered vendors that perform a variety of different research for the organization 102. In establishing a relationship, the relationship may be a contractual relationship as established by contracts 106a-106n (collectively 106) that are used to define the responsibility for each of the research companies 104 in performing and delivering research reports 108a-108n (collectively 108) to the organization 102. The research reports 108 may be delivered or electronically, as understood in the art. In delivering the research reports 108, each of the research companies 104 may establish its own format for the report. The format may be defined as both substantive and non-substantive information contained within the research report. For example, a substantive format characteristic may include presenting numerical information in metrics rather than English units, whereas a non-substantive format characteristic may include layout of the research information (e.g., bold versus non-bold section headings, authorship listed at the top versus bottom of the research report, etc.).

Figure 2A:
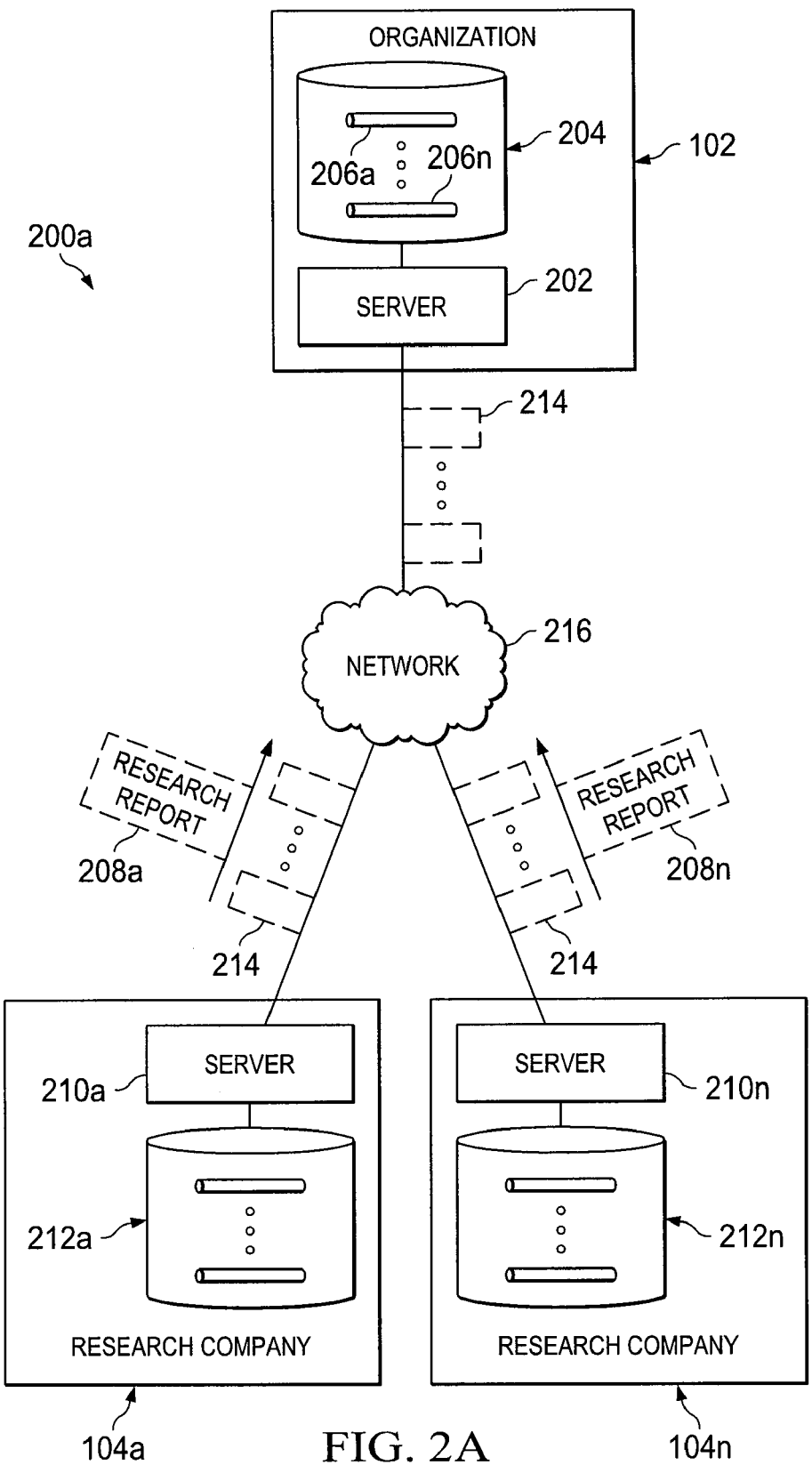
FIGS. 2A and 2B are illustrations of illustrative network environments in which the organization and research companies of FIG. 1 communicate with one another.

With regard to FIG. 2A, a network environment 200a may provide for the organization 102 to communicate electronically with the research companies 104. The organization 102 may utilize a server 202 that communicates with a storage unit 204. The storage unit 204 may include one or more data repositories 206a-206n (collectively 206) to store research reports 208a-208n (collectively 208) generated by the research companies 104. It should be understood that the research reports 208 may be collected and stored in one or more of the data repositories 206, where the research reports provided by each of the research companies 104 may be stored in the same or different data repositories 206.

Each of the research companies 104 may utilize a server 210a-210n (collectively 210) that is configured to format, store, and manage research reports stored in data repositories 212a-212n (collectively 212), respectively. As understood in the art, servers 210 may be configured to communicate data packets 214 including data representative of research report over network 216. The network 216 may be any communication network, such as the Internet, as understood in the art. In accordance with the principles of the present invention, each of the research companies 104 may be contracted to establish their research reports having standard information (e.g., title, author(s), abstract, report body, conclusion, etc.), but not necessarily having the same format. While the data format itself may not have the same appearance when displayed, each of the reports may use the same identifiers or tags to identify information (e.g., title, author, abstract, report body) contained in the research report. In one embodiment, the contractual relationship may require that each pdf research report include a corresponding xml document. For example, filename.pdf would have a corresponding xml file in the same folder called filename.xml. One embodiment of an xml formatted document is provided below.

```
<?xml version="1.0" encoding="utf-8" standalone="yes" ?>
<!DOCTYPE consultant-report>
    <consultant-report>
        <publicationinfo>
            <type> Business Market </type>
            <title>Security Delivery Model</title>
            <pubdate>
                <pubmonth>10</pubmonth>
                <pubday>10</pubday>
                <pubyear>2007</pubyear>
```

```
            </pubdate>
            <pagenums />
            <issuenum />
            <keywords>United States ,CI, Information and
Communication Technologies, Network Transmission Technologies,
Security Technologies, Intelligent Networks, Firewalls, Content Filtering,
Systems Integrity</keywords>
            <subject />
            <programname>Business Market Strategies
            </programname>
            <authorgroup>
                <firstname />
                <lastname />
                <lineage />
                <othername />
                <authorblurb />
                <email />
                <phone />
                <fax />
                <group />
            </authorgroup>
            <abstract>In this study we will discuss the drivers
contributing to the momentum...<abstract>
        </publicationinfo>
        <fileinfo>
            <filename>filename.pdf</filename>
            <filesize />
            <format>pdf</format>
            <ulink>filename.pdf</ulink>
        </fileinfo>
        <publisherinfo>
            <corpname>CompanyName</corpname>
            <address>555 company Street</address>
            <address>Company City, State, 55555-5555 USA
            </address>
            <phone>1.877.555-5555 (1.877.555-5555)</phone>
            <fax>1.888.555.5555</fax>
            <link>http://www.companysite.com</link>
        </publisherinfo>
    </consultant-report>
```

Each of the research companies 104 may use respective servers 210a-210n to manage research reports stored in respective storage units 212a-212n. In addition, each of the servers 210 may be configured to manage a website for access by the organization 102 and any other organization that contracts with the research companies 104. However, while members of the organization 102 may visit the websites of the research companies 104, in accordance with the principles of the present invention, the server 202 may be configured to download or otherwise collect research reports 208 from the research companies 104 on a periodic or non-periodic basis.

If the research reports 208 are to be downloaded on a periodic basis, then the server 202 may be configured to request research reports 208 from the servers 210 at regular intervals, such as daily. If the research reports 208 are to be collected on a non-periodic basis, then the server 202 may be configured to enable a user, such as an administrator or employee of the organization 102, to request an update of research via a research report collection system operating on the server 202 from one or more of the research companies 104 to be collected at any given time. In another embodiment, each of the servers 210 may be configured to automatically communicate research reports 208 to the server 202 of the organization in response to receiving a completed research report, on a periodic basis, or as directed by researchers at the research companies 104, for example. It should be understood that any configuration for communicating research reports 208 from the research companies 104 to the organization 102 may be utilized in accordance with the principles of the present invention.

Figure 2B:
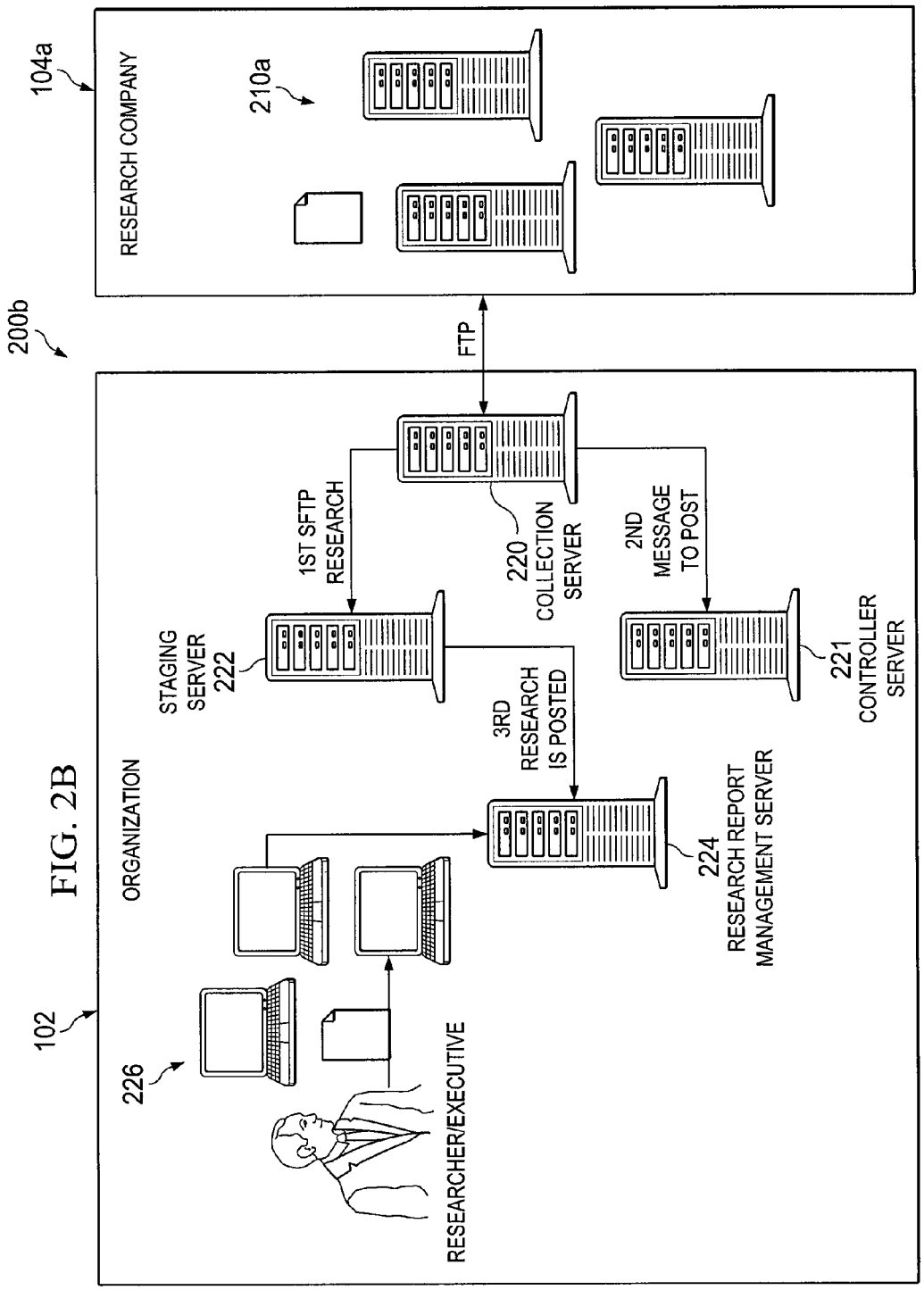

With regard to FIG. 2B, an alternative illustrative network environment 200b is provided. As shown, a collection server 220 is configured to communicate with server(s) 210a of external research company or 104a. The collection server 220 may use FTP to access and collect research reports from a data repository (not shown) from the external research company 104a. A controller server 221 may be configured to control operation of the collection server 220 by notifying the collection server 220 to collect research reports from one or more research company, for example. A staging server 222 may be configured to access the collect the collected research reports from the collection server 220. The staging server 222 may be configured to reformat the research reports from a format of the external research company 104a. A research report management server 224 may be configured to store and manage reformatted research reports. In one embodiment, the research report management server 224 may receive or collect the research reports using a secure FTP, as understood in the art. Members of the organization may use personal computers 226 to access the research reports being managed by the research report management server 224. It should be understood that the network configuration at the organization may vary and perform the same or analogous functionality in accordance with the principles of the present invention.

Figure 3:
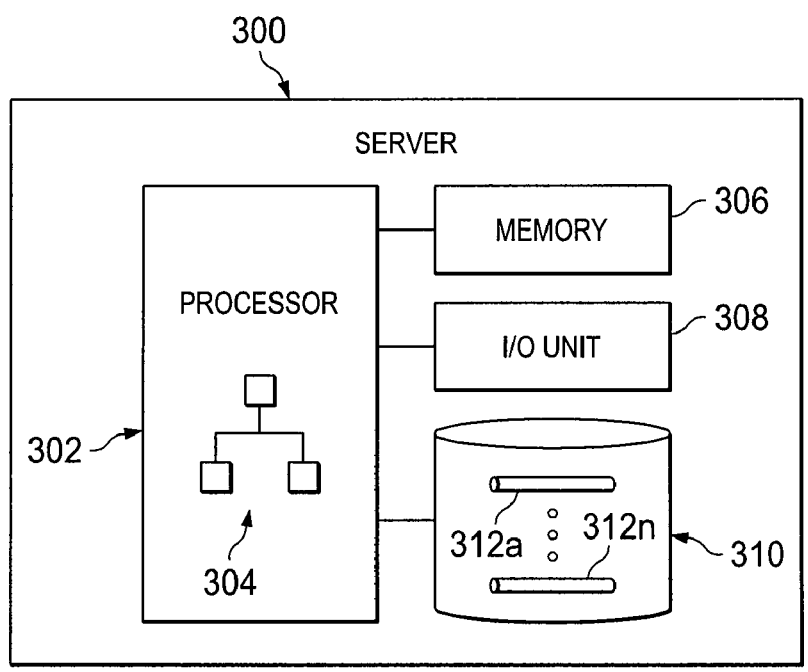
FIG. 3 is a block diagram of an illustrative server configured to provide for collection and management of research reports produced by research companies in accordance with the principles of the present invention.

With regard to FIG. 3, an illustrative server 300 utilized by an organization includes a processing unit 302 that executes software 304 that is configured to cause the processing unit 302 to perform collection, storage, and management of research reports. Although shown as a single processing unit 302, the processing unit 302 may include multiple processors located in a single or multiple computers. The processing unit 302 is in communication with memory 306, input/output (I/O) unit 308, and storage unit 310. The storage unit 310 may store data repositories 312a-312n (collectively 312) to store research reports collected from external research companies. It should be understood that the research reports may be stored in one or more data repositories 312. The data repositories 312 may be databases configured in a relational structure or otherwise.

Figure 4:
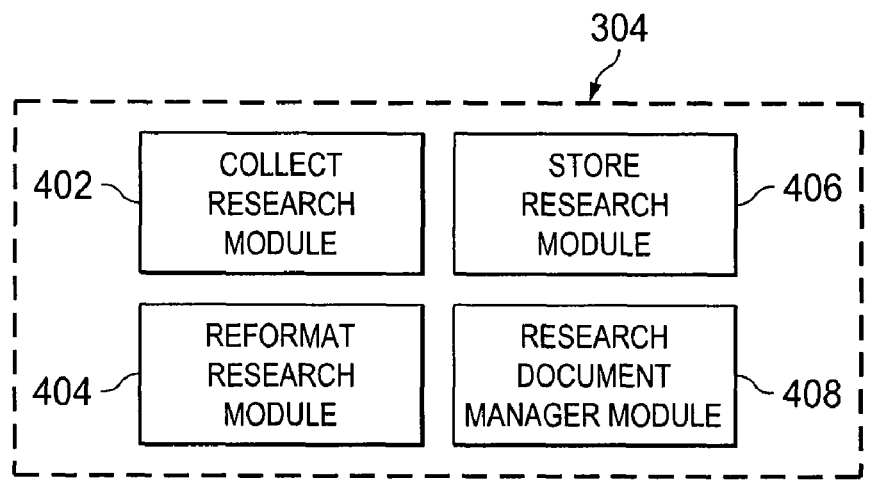
FIG. 4 is a block diagram of illustrative software modules configured to perform collection, reformatting, storage, and management of research reports within an organization.

With regard to FIG. 4, the software 304 may include a collect research module 402 that is configured to collect research from research companies. In one embodiment, the collect research module 402 may be configured to cause the processing unit 302 (FIG. 3) to periodically communicate with servers utilized by research companies to access and download research reports from the research companies. In an alternative embodiment, the collect research module 402 may be configured to cause the processing unit 302 to aperiodically access and download research reports from the research companies. In aperiodically downloading research reports, the collect research module 402 may receive a request from a user to download one or more research reports from a vendor research company.

A reformat research module 404 may be configured to remove formatting of a research report created by a research company and reformat the research report. In one embodiment, the formatting may be in the form of metadata that includes tags (e.g., <title></title>) of a particular markup language (e.g., HTML or XML) that define type and appearance of text in the research report. By reformatting each research report, each research report collected by the collect research module 402 is formatted in the same way so that members of the organization may become accustomed to research reports managed by the research system. In other words, irrespective how each research company formats their research reports, the research reports stored by the organization has substantially the same format such that each of the members need not learn the formats of each of the external research companies.

A store research module 406 may be configured to store research reports as collected by the collect research module 402 in their original formats and as produced by the reformat research module 404. The store research module 406 may be configured to store research modules from different research companies in separate data repositories or in the same data repository. In addition, the store research module 406 may be configured to store a profile associated with each research report to enable members of the organization to more easily search for and/or identify research reports. For example, the store research module 406 may associate a vendor or research company name, date, topic, subtopic, or any other information associated with the research report or research company to better enable users to locate relevant research. Each research document may be stored in a folder defined by a market name or research vendor. In one embodiment, the store research module 406 may be configured as follows:

```
<?xml version="1.0"?>
    <LIVELINKUPLOAD ID="1">
<LOADINFO Host="EDOC-SHARE" LOGIN="xxxx" PASSWORD="xxxx"
DELETESOURCE="FALSE" OUTPUT="XML" LOADTYPE="PATH"/>
<FILEINFO FILENAME="Research File Name.pdf"
FTPFILENAME="filename.pdf"><FOLDERPATH><FOLDER FOLDERNAME="All
EMBARQ"><FOLDER FOLDERNAME="Corporate Research"><FOLDER
FOLDERNAME="Secondary Market Research"><FOLDER FOLDERNAME="2008"><FOLDER
FOLDERNAME="Research Vendor"><FOLDER FOLDERNAME="Subscription
Name"/></FOLDER></FOLDER></FOLDER></FOLDER></FOLDER></FOLDERPATH></FILEINFO>
    </LIVELINKUPLOAD>
```

A research document manager module 408 may be configured to manage research reports stored in one or more data repositories. The research document manager module 408 may provide a graphical user interface (GUI) and provide for search and/or sort tools to enable users to more easily identify research in which he or she may be interested. The research document manager module 408 may be a commercial document management system, such as DocShare®, or a non-commercial document management system.

Figure 5:
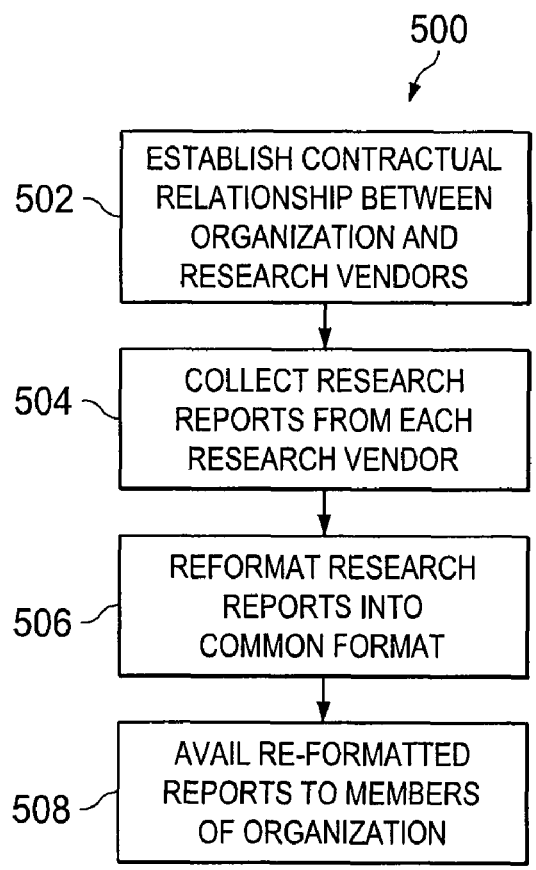
FIG. 5 is a flowchart of an illustrative process for collecting and managing research reports.

With regard to FIG. 5, an illustrative process 500 may include establishing a contractual relationship between an organization and research companies or vendors. The contractual relationship may be in writing or otherwise. A relationship is established between a research company and organization as the research company is typically contracted to provide research services to members of the organization. In one embodiment, the contractual relationship may specify a format by which the research company is to produce research reports, so that the organization can more easily create a common format of research reports that are collected and stored by the organization. At step 504, research reports may be collected from each research vendor. In collecting the research reports, the research reports may be collected via a network in an automatic fashion or manual fashion. In one embodiment, research reports that are collected may be collected periodically (e.g., daily) or aperiodically (e.g., a response to a user requesting a research report to be collected). In one embodiment, collecting research reports from a research company may be performed using file transfer protocol (FTP), e-mail, or any other form of communication of electronic data as understood in the art. In addition, collection of data reports may be performed through the use of paper, as was traditionally done.

At step 506, research reports may be reformatted into a common format so that users who access the research reports become familiar with the format of research reports stored by the organizations. In reformatting the research reports, a research report having tags, such as hypertext markup link (HTML) tags, may be removed and replaced with the same or different tags so as to reformat information contained in a research report. In one embodiment, the research reports that are reformatted are done so such that data contained in each research report is positioned in the same place and has the same visual format (e.g., bold, italicized, etc.), thereby providing a common format for every research report produced by research companies external to the organization.

At step 508, the reformatted reports are availed or otherwise made available to members of the organization. In making the research reports available to the members of the organization, each of the research reports may be stored in a data repository and be accessed by members using a document management system, such as DocShare™. The document management system may operate as a user interface to allow users to search, sort, view, or otherwise identify research reports stored by the organization. The research reports may be stored in such a way as to identify the research company and members who requested the research, thereby allowing other members of the organization to become familiar with research efforts being made by different members of the organization.

With regard to FIG. 6, a process 600 may be utilized to collect research reports. A collect vendor research module 602 may be utilized to electronically collect research from one or more research companies. As shown, the collect vendor research module 602 may collect research reports from a research company data repository 604 using process 600. At step 606, a check current research reports list may be performed by the collect vendor research module 602. At step 608, the collect vendor research module 602 may request a current research list from the research company data repository 604. At step 610, the research company data repository 604 may return a current research list. The current research list may include a list of research reports collected from each vendor. At step 612, the collect vendor research module 602 may compare the current research list currently available at the organization and the research list that is current at the research company. If any new research reports are available at the research company data repository 604, then new research reports may be requested from the research company data repository 604 from the collect vendor research module 602 at step 614. At step 616, the research company data repository 604 may communicate new research reports to the collect vendor research module 602. At step 618, new research reports may be stored by adding information representative of the new research reports (e.g., title, date, author) to the current research reports list. By utilizing the process 600, research reports may be efficiently collected from each research company.

With regard to FIG. 7, a process 700 may be utilized to update collected research reports by a post vendor research reports module 702 in a document management system 704. At step 706, the post vendor research reports module 702 may check a current research reports list. At step 708, if new research reports are available on the research reports list, the new research reports may be staged in the document management system 704 at step 708. At step 710, the document management system 704 may provide a confirmation that the new research reports have been staged. At step 712, the post vendor research reports module 702 may post new research reports in the document management system 704. In communicating with the document management system 704, a secure file transfer protocol (SFTP) may be utilized. In response to the new research reports being posted, the document management system 704 may issue a confirmation to the post vendor research reports module 702. At step 716, the post vendor research reports module 702 may update the current research reports list.

Figure 8:
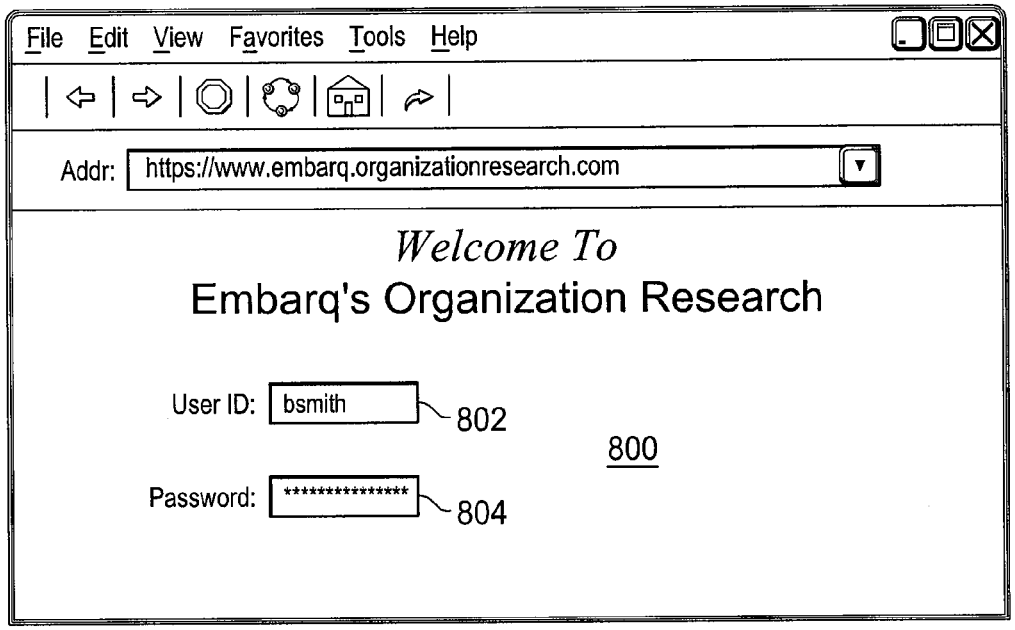
FIG. 8 is a screenshot of an illustrative intranet or Internet website of a research report management system.

With regard to FIG. 8, a screenshot of an illustrative graphical user interface 800 is shown. The GUI 800 is a login screen that allows members of an organization to log into an organization's research system that is configured to collect and store research from external research companies in the same or similar format. The login screen includes a user ID field 802 and password field 804 that each member of the organization may enter information to access research from one or more different research companies stored in the research system. In one embodiment, depending upon the employee level, employee job description, or any other employee identifier, a member who logs into the organization research system may have access to limited or all research performed by each of the research companies.

Figure 9:
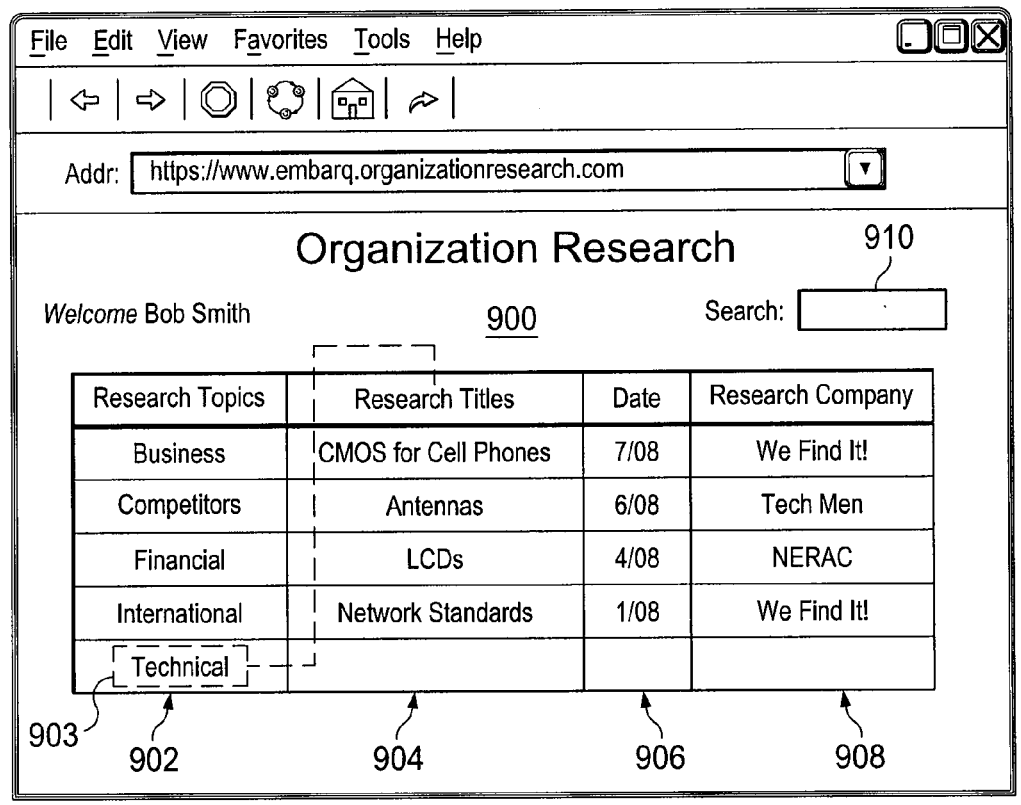
FIG. 9 is a screenshot of an illustrative page of a document management system storing research reports.

With regard to FIG. 9, an illustrative user interface 900 is provided. As shown, research topics 902 may include business, competitors, financial, international, technical, and so on. The different research topics may include more, less, or different research topics based on the type of organization and research requests made by members of the organizations to outside research companies. The member, Bob Smith, is shown to have selected a research topic 903, "technical," and be provided with a list of research titles 904, dates of research 906, and research company 908 that identify different research reports that fall under the technical research topic. It should be understood that other information associated with each research report may be provided, such as researcher, member who requested the research report, or otherwise. The user may sort the research reports by research title, date, research company, or any other information available. In addition, the user may enter words in a search text entry field 910, as understood in the art, and research reports that include search terms or meet conditions provided in the search text entry field 910 may be provided to a user for selection to open and view one or more research reports. It should be understood that any user interface provided by a document management system may be provided to the user to locate research reports either requested by him or her or available to any or particular members of the organization as established by a manager of the research reports document management system.

TABLE I provides an exemplary list that may be utilized by the research system to define accessibility to different members of the organization. As shown, each member of the organization is provide with access rights to one or more different research fields, such as technical, business, or all.

TABLE I

Member Accessibility Table

| Member Name | Member ID | Member Dept | Access Fields |
|---|---|---|---|
| Bob Smith | 0123 | Technical | Technical |
| Steve Jones | 1234 | Business | Business Competitors |
| Robert Collins | 2345 | Executive | All |
| Lisa Smith | 3456 | Technical | Technical |
| ... | ... | ... | ... |

Figure 10:
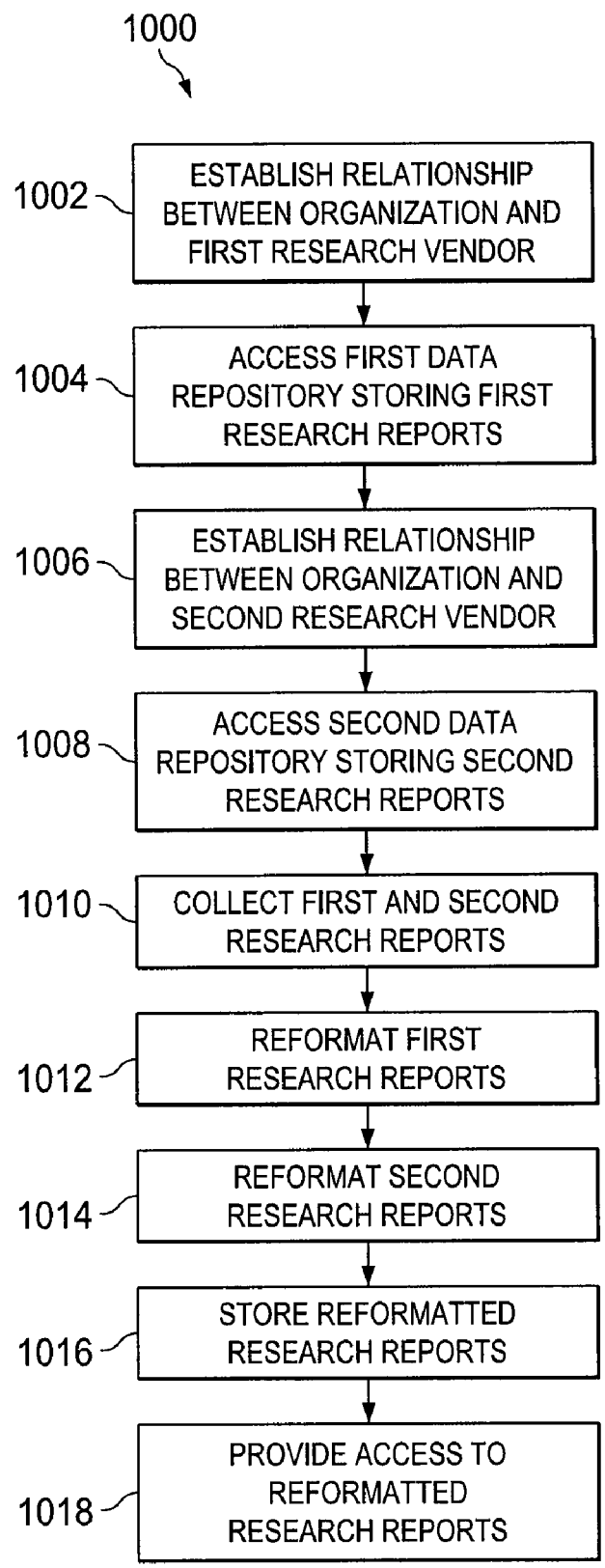
FIG. 10 is a flow chart of an illustrative process for collecting and managing research reports from research companies in accordance with the principles of the present invention.

With regard to FIG. 10, a process 1000 for managing research produced by outside research vendors is provided. At step 1002, a relationship is established between an organization and a first research vendor to perform research and produce first research reports. A first data repository operated by the first research vendor may be accessed at step 1004. The first data repository stores the first research reports. At step 1006, a relationship is established between the organization and a second research vendor to perform research and produce second research reports. At step 1008, a second data repository operated by the second research vendor may be accessed. The second data repository stores the second research reports.

At step 1010, the first and second research reports may be collected from the first and second repositories of the first and second research vendors. In one embodiment, the first and second research reports have first and second formats, respectively. At step 1012, the first research reports are reformatted from the first format into a third format, where the third format is a format utilized by the organization. At step 1014, the second research reports are reformatted from the second format into the third format. The translated first and second research reports may be stored in a central data repository at step 1016. Access is provided to the first and second research reports in the third format to members of the organization at step 1018. The access is provided to the members of the organization by allowing the members to log into a document management system or otherwise view a list of the research reports. In one embodiment, each member is provided with permission to access some or all of the research reports.

The previous detailed description is of a small number of embodiments for implementing the invention and is not intended to be limiting in scope. One of skills in this art will immediately envisage the methods and variations used to implement this invention in other areas than those described in detail. The following claims set forth a number of the embodiments of the invention disclosed with greater particularity.

What is claimed:

1. A method for managing research produced by outside research vendors, said method comprising:
   establishing a relationship between an organization and a first research vendor to perform research and produce first research reports;
   accessing a first data repository operated by the first research vendor, the first data repository storing the first research reports;
   establishing a relationship between the organization and a second research vendor to perform research and produce second research reports;
   accessing a second data repository operated by the second research vendor, the second data repository storing the second research reports;
   collecting the first and second research reports from the first and second repositories of the first and second research vendors, the first and second research reports having content with first and second visual layouts, respectively, wherein the first visual layout is different from the second visual layout;
   reformatting the content of the first research reports from the first visual layout into a third visual layout;
   reformatting the content of the second research reports from the second visual layout into the third visual layout, the first research reports and second research reports thereby having content with the same visual layout;
   storing the reformatted first and second research reports in a central data repository;
   providing access to the first and second research reports with content in the third visual layout to members of the organization; and
   wherein, in response to a member of the organization requesting to search for a research report in the first and second research reports stored in the central data repository, further searching for the research report in the first and second research reports stored in the central data repository.

2. The method according to claim 1, wherein establishing a relationship between an organization and the first and second research vendors includes forming a contractual relationship between the organization and the first and second research vendors.

3. The method according to claim 1, wherein access of the first data repository includes communicating via a network to communicate with the first data repository and the central repositories.

4. The method according to claim 1, wherein providing access to the first and second research reports includes providing the members of the organization with information to view the first and second research reports stored in the central repository.

5. The method according to claim 1, wherein reformatting the first research reports from the first visual layout to the third visual layout includes:
   parsing the content of a first research reports formatted using tags defined by a markup language;
   altering at least a portion of the tags of the first research report to reformat the content:
      wherein reformatting the content visual layout of the second research reports from the second visual layout to the third visual layout includes:
         parsing content of a second research report formatted using tags defined by a markup language; and
         altering at least a portion of the tags of the second research report to reformat the content visual layout.

6. The method according to claim 5, wherein altering at least a portion of the tags includes deleting, changing, or adding tags to reformat the content visual layout.

7. The method according to claim 1, further comprising operating a document management system configured to be in communication with the central data repository and, in response to members of the organization requesting to access the first and second research reports, further accessing the first and second research reports.

8. The method according to claim 1, wherein storing the translated first and second research reports in a central repository includes storing the first research reports in a sub-data repository separate from a sub-data repository used to store the second research reports.

9. The method according to claim 1, wherein accessing and collecting the first and second research reports is performed on a periodic basis.

10. The method according to claim 1, wherein collecting the first and second research reports includes using file transfer protocol (FTP) to respectively download the first and second research reports from the first and second data repositories.

11. A system for managing research produced by outside research vendors, said system comprising:
a storage unit;
a data repository stored on said storage unit;
a processing unit in communication with said storage unit and said data repository, said processing unit configured to:
collect first research reports from a first research vendor;
collect second research reports from a second research vendor, the first and second research reports having content with first and second visual layouts, respectively, wherein the first visual layout is different from the second visual layout;
reformat the content of the first research reports from the first visual layout into a third visual layout;
reformat the content of the second research reports from the second visual layout into the third visual layout, the first research reports and second research reports thereby having content with the same visual layout;
store the reformatted first and second research reports in the data repository;
provide access to the first and second research reports with content in the third visual layout to members of the organization; and
wherein said processing unit is further configured to, in response to a member of the organization requesting to search for a research report in the first and second research reports stored in the central data repository, further searching for the research report in the first and second research reports stored in the central data repository.

12. The system according to claim 11, wherein said processing unit, in accessing the first data repository, communicates via a network with a first data repository of the first research vendor.

13. The system according to claim 11, wherein said processing unit is further configured to:
receive a user ID and password of a member of the organization;
determine whether the member has access rights to the first and second research reports, and, if so, in response to the member requesting to view the first and second research reports stored in the central repository, accessing the first and second research reports.

14. The system according to claim 11, wherein said processing unit, in reformatting the first research reports from the first format to the third format:
parses the content of a first research report formatted using tags defined by a markup language; and
alters at least a portion of the tags of the first research report to reformat the content visual layout;
wherein said processing unit, in reformatting the content layout of the second research reports from the second visual layout to the third visual layout:
parses the content of a second research report formatted using tags defined by a markup language; and
alters at least a portion of the tags of the second research report to reformat the content visual layout.

15. The system according to claim 14, wherein said processing unit, in altering at least a portion of the tags, deletes, changes, or adds tags to reformat the content visual layout.

16. The system according to claim 11, wherein said processing unit is further configured to operate a document management system configured to be in communication with said data repository to, in response to members of the organization requesting to access the first and second research reports, further accessing the first and second research reports.

17. The system according to claim 11, wherein said data repository is configured to include sub-data repositories to store research reports from different research vendors.

18. The system according to claim 11, wherein said processing unit is configured to collect the first and second research reports on a periodic basis.

19. The system according to claim 11, wherein said processing unit is further configured to collect the first and second research reports using file transfer protocol (FTP) to respectively download the first and second research reports.

* * * * *